United States Patent [19]

Weissenbach, deceased et al.

[11] Patent Number: 4,499,885
[45] Date of Patent: Feb. 19, 1985

[54] SUPPLEMENTAL SYSTEM FOR FUEL AGENCY

[76] Inventors: Joseph Weissenbach, deceased, late of Los Angeles, Calif.; by Jane A. Shahrokh-Khani, executor, 1472½ Morton Pl., Los Angeles, Calif. 90026

[21] Appl. No.: 527,874

[22] Filed: Aug. 30, 1983

Related U.S. Application Data

[63] Continuation of Ser. No. 441,808, Nov. 2, 1982, abandoned, and a continuation-in-part of Ser. No. 36,496, May 7, 1979, abandoned, Continuation-in-part of Ser. No. 664,479, Mar. 8, 1976, abandoned, and Ser. No. 263,708, May 14, 1981, abandoned.

[51] Int. Cl.³ .............................................. F02M 13/08
[52] U.S. Cl. ...................................... 123/525; 123/575; 123/578; 123/526; 123/27 GE
[58] Field of Search ................... 123/27 GE, 576, 577, 123/575, 578, 525, 527

[56] References Cited

U.S. PATENT DOCUMENTS

| | | | |
|---|---|---|---|
| 2,645,906 | 7/1953 | Ryan | 123/525 |
| 2,708,916 | 5/1955 | Davids | 123/525 |
| 2,734,490 | 2/1956 | Moulton | 123/525 |
| 2,785,966 | 3/1957 | Rockwell | 123/525 |
| 3,184,295 | 5/1965 | Bauerstock | 123/525 |
| 3,577,877 | 5/1971 | Warne | 123/525 |
| 3,753,424 | 8/1973 | Haidvogel | 123/525 |
| 3,982,516 | 9/1976 | Abernathy | 123/575 |
| 4,031,864 | 6/1977 | Crothers | 123/575 |
| 4,068,639 | 1/1978 | Cook | 123/525 |

Primary Examiner—Ronald H. Lazarus
Attorney, Agent, or Firm—Beehler, Pavitt, Siegemund, Jagger & Martella

[57] ABSTRACT

A supplemental fuel system for a combustion engine has a primary fuel supply feeding the combustion chamber directly and a supplemental fuel supply which feeds into the combustion air intake. The supply of primary fuel is appropriately reduced or regulated by automatic control and the supply of the supplemental fuel is continuously automatically adjusted to the supply of primary fuel. Initially the supplemental fuel in vapor state is introduced into the air intake until the heat exchange vaporizer system warms up, when there is an automatic shift to the liquid state of supplemental fuel. A temperature compensator in the air intake connected to the supplemental fuel supply holds the temperature of the supplemental fuel at the same temperature as the air with which it is mixed before passing to the final metering orifice and then to the combustion chamber. In case of failure or malfunction of the supplemental fuel supply system, a fail-safe mechanism automatically cuts off the supplemental fuel portion of the system allowing the entire system to operate at restored full power output on the primary fuel.

63 Claims, 11 Drawing Figures

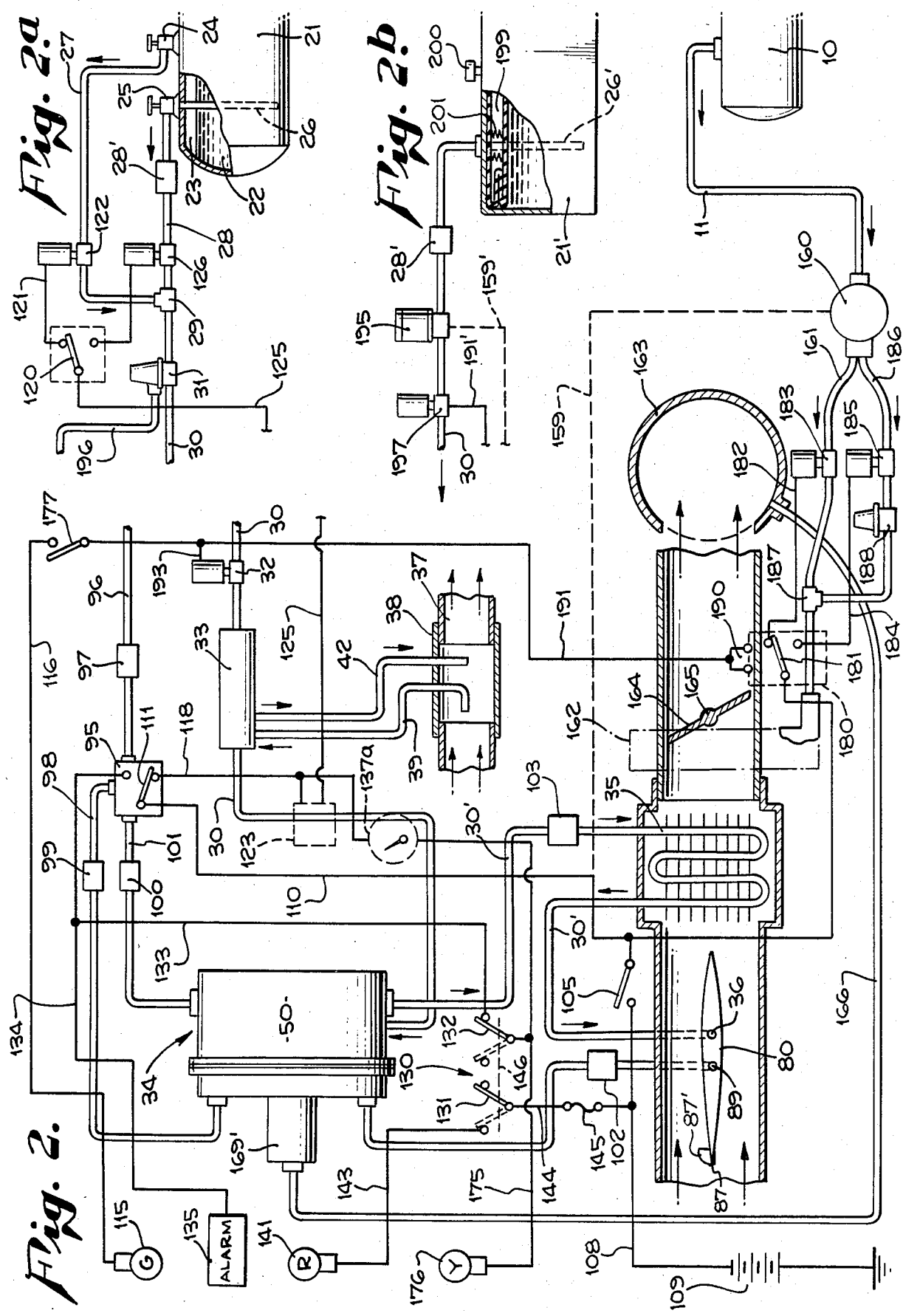

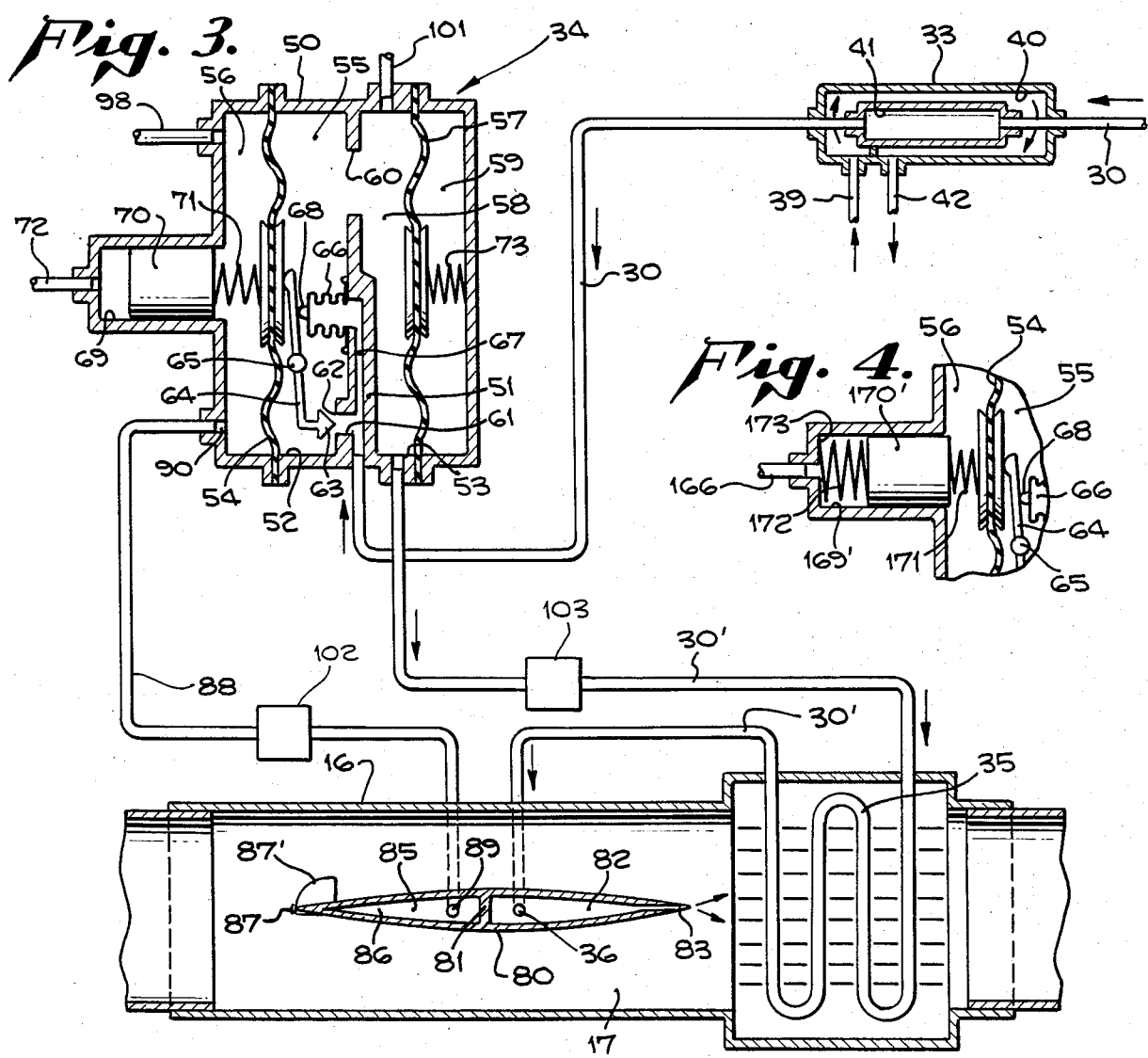
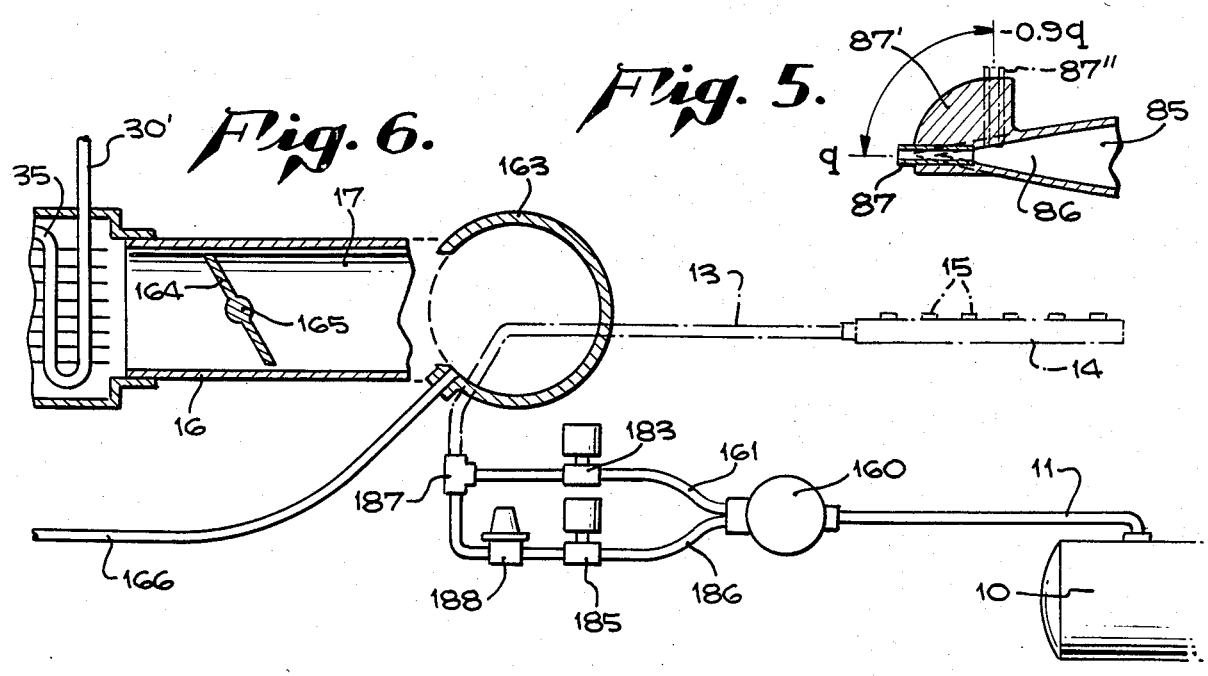

SUPPLEMENTAL SYSTEM FOR FUEL AGENCY

This is a continuation-in-part of application Ser. No. 664,479, filed Mar. 8, 1976, now abandoned, application Ser. No. 36,496, filed May 7, 1979, now abandoned, application Ser. No. 263,708, filed May 14, 1981, now abandoned, and a continuation of Ser. No. 441,808, filed Nov. 2, 1982 now abandoned.

It has long been recognized that the average combustion engine or thermodynamic system burning a hydrocarbon fuel operates at very low efficiency. In other words, only a relatively small portion of the total energy present in the fuel is converted into useful work. Many attempts, especially in recent times, have been made to increase this efficiency, but gains have been relatively modest and critically limited.

One area of development which has been relatively active has been directed to use of liquefied petroleum gas (LPG), and particularly propane, as a supplemental fuel. Although there have been some relatively minor advantages inherent in LPG so utilized, there are attendant major and substantial disadvantages.

One such disadvantage is disregard of an inability to conceive a means of coping with substantial pressure changes within the LPG tank occasioned by response of LPG to ambient temperature changes or insolar radiation conditions resulting in subsequent final delivery pressure changes and fluctuations at the final metering means. These fluctuations have been erroneously deemed inconsequential in conventional carburetion systems because they only affect economy and efficiency to a minor degree and, although noticeable but problematic only in extremes, cause rough idling conditions. Current energy conditions coupled with the stringent emissions control standards have combined to create a serious problem in this area. Past and present strictly "DUAL-FUEL" systems inherently embody this problem which is of major magnitude involving, as it does, a propensity toward inefficiency on the one hand and destructive temperatures and pressures on the other.

It has been common practice to simultaneously vaporize and regulate pressures in the same chamber. Since conversion of LPG from liquid to vapor state produces a virtually instantaneous volumetric expansion of the order of 270:1, it becomes economically impossible to avoid pressure surges of the average magnitude of + or −25%. Again, this problem has been poorly recognized at best in the carburetion field and is inherent in past and existing "dual-fuel" applications.

Furthermore no previous or existent "dual-fuel" system has accommodated the thermo-volumetric effects of vapor to intake air temperature fluctuations. Even with all the adjustments embodied in past and existing applications, no means of maintaining adjustment or eliminating the need for same has heretofore been devised.

All previous concentration seems to have been centered on development of an established and maintained "dual-fuel" system of constant fuel-to-fuel to air ratio throughout the operating range of a flexible speed/load CI engine. Establishment of this dogma was based on the successes experienced in conjunction with applications in the stationary one-speed, one-load power unit area. Since it has never before been possible to achieve the "dual-fuel" goal, it follows that by so doing the present invention reveals the fallacy which has prevailed through the years.

The foregoing critiques have been the reasons for comparatively incomplete efficiencies, requirement of adjustment means, and foreshortening of engine life. Most important, however, is the safety factor, or conversely the danger and runaway engine or destructive factor, which is historic and never remedied by a fail-safe system.

More recently dual-fuel systems have been investigated directed to the employment of propane as a secondary fuel to be mixed with air in conjunction with diesel fuel as a primary fuel in the interest of improving efficiency of performance.

Historically, prior activity in dual-fuel systems has been predicated on the premise that the establishment of a certain constant fuel-to-fuel only ratio would produce certain increases in performance and efficiency of a thermodynamic system. Expedients which have been undertaken have been on occasion directed to one form or another of carburetion or aspiration, utilizing induced air velocity as the criterion determinate. Due to the basic nature of a compression ignition engine, namely one having no air throttle, air velocity increases or decreases only in coincidence with piston speed. Such increases are in no way proportional because the piston, always larger than the intake valves in cross-sectional area, demands more air as its speed increases than the valves can supply at the same speed. Since reistance squares as speed increases and since intake valves are by no means efficient air ducts, it becomes apparent from start-up, no reciprocating internal combustion engine provides an adequate volumetric or air velocity proportion as related to piston speed. In view of the foregoing, it becomes evident that as piston speed increases, the volume of each air induction occasion decreases at the same time and compression, pressure, and temperature rise and fall correspondingly.

As air volume per air induction occasion varies, the amount of primary fuel injection per occasion varies disporportionately to actual mechanical volumetric displacement of cylinder configuration. In practice the carburetion or aspiration approach has not provided acceptable improvements and efficiency, and, in fact, has produced foreshortening of engine life and in many cases severe damage.

The developmental approach of a somewhat different character is one directed to the introduction of propane as a vapor into the combustion air intake. This approach has produced somewhat improved efficiency and performance at full power only. Although the prospect of this approach has been encouraging, too much reliance has had to be placed on continual or frequent manual adjustments, and the character of propane is such that, in the absence of adequate safeguards, a great deal of potential efficiency has been lost together with virtually epidemic failures and foreshortened engine life in all but stationary, constant speed/load applications.

It is, therefore, among the objects of the invention to provide a new and improved supplemental system and method wherein the introduction of a secondary agency, as for example a fuel in the form of propane, is keyed to the demand for primary fuel and air, as for example diesel fuel, so that the ratio is one productive of optimum efficiency in the utilization of available energy as each combustion occasion warrants.

Another object is to provide a new and improved supplemental system and method wherein fuel of a renewable type, for example Methanol, as contrasted with fossil type fuel, can be combined in gaseous form with combustion air for an engine operating on fuel of a fossil type, the introduction of fuel of the renewal type being adjusted to engine demand to effect maximum conservation of the fossil type fuel.

Another object of the invention is to provide a new and improved supplemental fuel system wherein a liquified petroleum gas is introduced to the combustion air supply at a rate determined to a substantial degree by the demand of the engine for primary fuel and air, there being present in the system properly located flow regulating means for both types of fuel.

Still another object of the invention is to provide a new and improved dual-fuel system for introducing liquified petroleum gas as a supplemental fuel into the combustion air intake of an enging using a primary liquid fuel wherein a regulator constantly responsive to the pressure condition in the primary fuel supply serves to adjust the flow of secondary fuel, and wherein there is an additional balancing effect on the pressure ratios thus established, which is responsive to the flow of air in the combustion air supply.

Still another object of the invention is to provide a new and improved supplemental fuel system for a combustion engine wherein a liquid hydrocarbon serves as the primary fuel and a liquified petroleum gas serves as the secondary fuel and wherein at an early stage in operation, the supplemental fuel, initially served as a vapor, is switched to a liquid supply for subsequent conversion into a vapor and wherein there is a constant control in the secondary fuel supply exercised by conditions in the primary fuel supply.

Still further among the objects of the invention is to provide a new and improved supplemental fuel system wherein there is a virtually infallible fail-safe mechanism serving all portions of the supplemental fuel system so that should internal leaks or defects in control media occur creating excessive or hazardous pressures, the fail-safe mechanism is such that when so called upon it immediately and automatically cuts off all functions of the supplemental fuel system, shuts off supply of supplemental fuel at its tank, deactivates the primary fuel bypass system thereby restoring full power to the primary fuel system, and simultaneously energizes both visible and audible warning alarms thereby signaling the operator to utilize the embodied manual emergency cut-off switch which in turn silences the audible alarm, deactivates the entire supplemental fuel system and its adjuncts, maintains full primary fuel power, and at the same time permanently illuminates a visual signal which indicates emergency cut-off condition until corrective service has been performed. Should operating pressures fall below normal due to malfunction or low supplemental fuel supply, a separate visible only signal is activated.

Still further among the objects of the invention is to provide a new and improved supplemental fuel system for a combustion engine wherein the primary fuel is served to the combustion chamber directly at a controlled pressure with the secondary fuel served to the operation through the combustion air intake and under conditions where the ratio of the two fuels and air is kept automatically and autonomously at optimum conditions productive of an overall efficiency for the supplemental fuel system which exceeds the sum of efficiency attainable by employment of either of the fuels separately.

With these and other objects in view, the invention consists in the construction, arrangement, and combination of the various parts of the device, whereby the objects contemplated are attained as hereinafter set forth, pointed out in the appended claims, and illustrated in the accompanying drawings.

FIG. 2 is a schematic diagram of a gasoline primary fuel system.

FIG. 2a is a schematic diagram of an LPG supplemental fuel component operational with either FIG. 1 or FIG. 2.

FIG. 2b is a schematic diagram of a methanol type supplemental fuel component operational with either FIG. 1 or FIG. 2.

FIG. 3 is a sectional view of a typical pressure responsive regulator, spray bar, heat exchanger, and temperature compensator.

FIG. 4 is a fragmentary sectional view of a modified portion of a pressure responsive regulator.

FIG. 5 is a detailed fragmentary sectional view of the leading edge of the spray bar.

FIG. 6 is a schematic sectional view of a primary fuel component set up to supply gasoline as primary fuel for an injection system engine.

Figure 1:
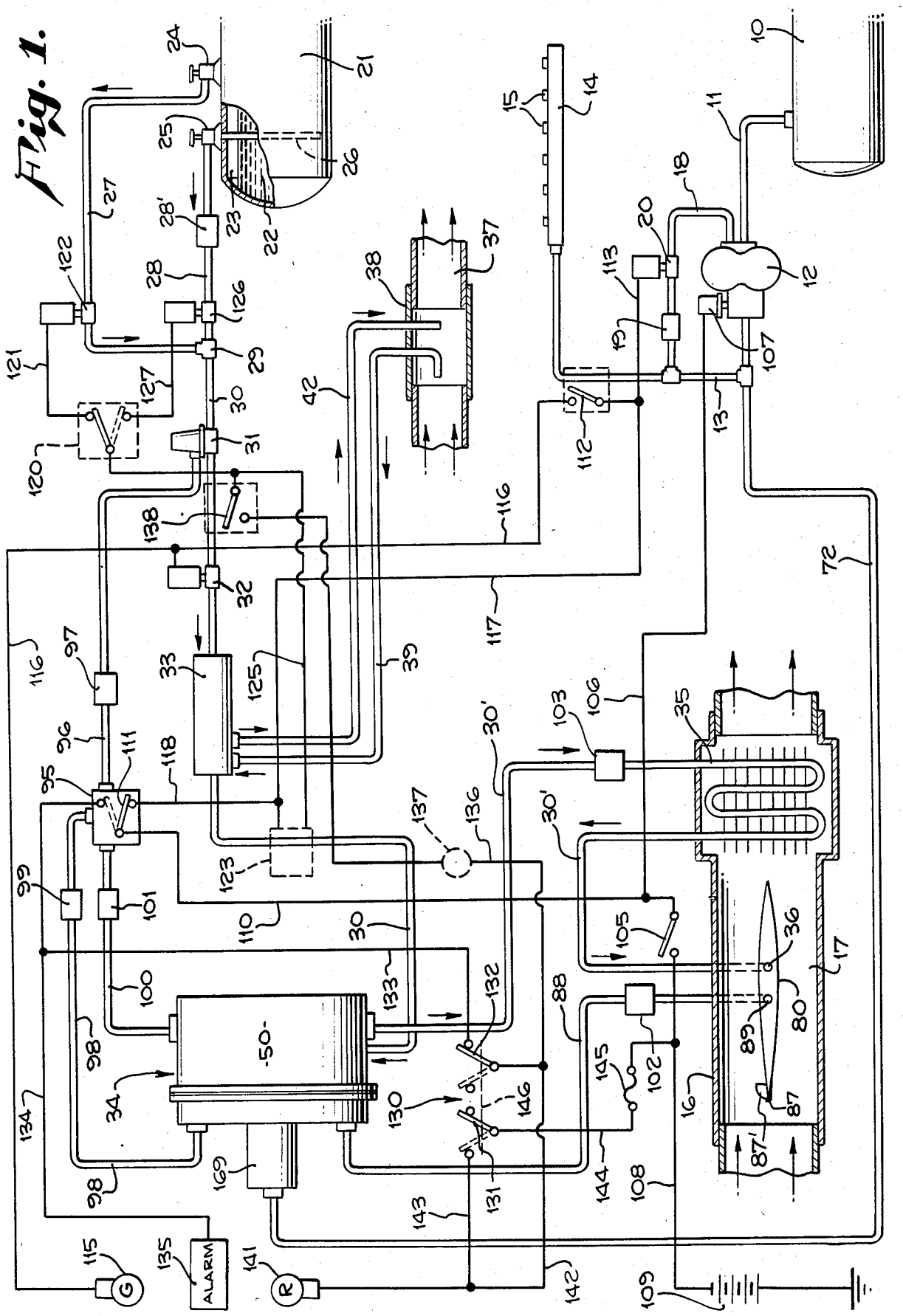
FIG. 1 is a schematic diagram of a diesel primary fuel-LPG supplemental fuel system.

In an embodiment of the invention chosen for the purpose of illustration, a diesel engine has been referred to as a matter of convenience and ease of explanation. It should be rocognized, however, that the supplemental fuel system is comprehensive in itself and directly applicable to other types of engines wherein hydrocarbon or hydroxyls of saturated hydrocarbons such, for example, as methanol $(CH_3)+OH$ are mixed with air for combustion. There are two superimposed schematic representations, one of the mechanical portions of this system including the fuel distribution system, and the other of the electrical portion of the system which cooperates with the mechanical portion.

MECHANICAL COMPONENTS

A primary fuel tank 10 is provided for primary liquid fuel such for example as diesel fuel, hereinafter referred to as PF, where the system is designed to supply a diesel or CI engine. From the PF tank 10 a PF line 11 supplies a fuel pump 12 from which a PF line 13 leads to a governed pressure PF accumulator 14, namely a typical diesel fuel distributing accumulator from which a series of individual governed pressure fuel lines 15 provide fuel for the engine injectors. An intake air duct 16 provides a supply of combustion air flowing through a passage 17 of the duct to an appropriate portion of the combustion engine (not shown).

As an accessory there is provided a bypass PF line 18 in which is located a bypass orifice fitting 19 and a PF bypass solenoid valve 20, normally closed, automatically providing a means of proportionally reducing PF metering to comply with SF supplementation ratios when SF system is functioning, and reciprocally restoring full PF power when SF system is deactivated.

For storing supplemental fuel, hereinafter referred to as SF, which in the chosen embodiment is assumed to be liquefied petroleum gas (LPG), such for example propane, there is a tank 21 wherein SF 22 in liquid form is in the lower portion of the tank and SF 23 in vapor or gaseous form occupies the upper portion of the tank 21. A valve 24 connects to the upper portion of the tank 21 for drawing off SF vapor. A valve 25 from which a stand pipe 26 extends to the bottom of the tank 21 is for expressing off SF in liquid form. An SF vapor line 27 from the valve 24 joins an SF liquid line 28 from the valve 25 at a junction fitting 29 out of which a common SF line 30 extends, there being a filter 28' in the SF liquid line 28. In the common SF line is a line pressure regulator 31 and functional solenoid valve 32, downstream of which the common SF line feeds into a heat exchange vaporizer 33. From the heat exchange vaporizer 33 the SF line supplies a pressure responsive regulator indicated generally by the reference character 34 from which a continuation 30' of the SF line feeds into a temperature equalizer 35 and from there through a continuation of the SF line 30' to a final metering orifice 36 in the air intake passage 17. It will be clear from the location of the final metering orifice 36 that SF is mixed with the intake air supply and in that way reaches the combustion chamber (not shown) of the engine.

A convenient way for supplying heat to the heat exchange vaporizer 33 is to make use of hot exhaust gas 37 flowing through an exhaust pipe 38 whereby a hot gas inflow pipe 39 conducts hot exhaust gases into a hot chamber 40 for heating a conversion chamber 41 through which PF flows. An outflow pipe 42 conducts exhaust gas from the hot chamber 40 back to the exhaust pipe 38 thereby to provide an aerodynamically assisted thermo-volumetric means of vaporization of SF.

Although heating SF by use of hot exhaust gas is an economical and convenient means, it will be appreciated that heating can be effectively accomplished with some other appropriate heat exchanger upstream of the pressure responsive regulator.

PRESSURE RESPONSIVE REGULATOR

The pressure responsive regulator heretofore made reference to generally by the reference character 34 is shown by way of example to consist of a jacket 50 in which is a rigid wall 51 which separates the interior of the jacket into a regulator chamber 52 and a surge chamber 53. In the regulator chamber is a yieldable partition 54, in the form of a diaphragm in the chosen embodiment, which separates the regulator chamber into a first section 55 on one side and a second section 56 on the other side. Similarly, a yieldable partition 57, likewise in the form of a diaphragm in the chosen embodiment, separates the surge chamber 53 into a first section 58 and a second section 59. A passage 60 provides communication between the first section of the regulator chamber and the first section of the surge chamber.

SF enters the first section 55 of the regulator chamber through a port 61 passing a valve seat 62 controlled by a valve element 63. The valve element 63 is mounted on a first class lever arm 64 pivotally supported at a pivot point 65.

SF pressure is also exercised on a bellows 66, or other suitable reciprocating motor, which it reaches through a bore 67, the bellows being in a position to bear against a point 68 of the lever arm 64 on the opposite side of the pivot point 64. Specific flow pressures through the port 61 are always assured by balancing the area of the valve element 63 against which pressure is exerted at a separated distance from the pivot point 65 serving as a fulcrum and the area of the bellows subject to the same pressure acting on the lever arm at the same or a different distance from the pivot 65. Balancing thus eliminates pressure fluctuations caused by variations in tank pressure induced by changes in SF temperatures vs. changes in ambient temperatures and resultant pressures.

The pressure responsive regulator serves to determine the ratio of PF and SF ultimately reaching the combustion chamber of the engine. This is accomplished in part by the provision of a piston 70 in a cylinder 69 acting through a spring 71 against the yieldable partition or diaphragm 54. Action of the piston 70 is subject to PF pressure in the PF fuel line 13 which reaches the piston through a PF pressure line 72. The piston 70 is illustrative of one type of reciprocating motor. Other reciprocating motive means may be differential or non-differential, such as a diaphragm, bellows, etc. appropriately spring and/or pressure fortified or countered.

In acting as a surge suppressor the yieldable partition or diaphragm 57, action of which is backed up by a spring 73, is subject to pressure in the SF line and any sudden fluctuations caused by vaporization or other influences in SF pressure are absorbed in part by the yieldable partition 57 and the spring 73, thereby to smooth out any variations in pressure thermally or mechanically induced as SF flows through the temperature equalizer 35 and ultimately out the final metering orifice 36 into the intake air duct 16.

SPRAY BAR STRUCTURE

A spray bar 80 which extends across the air intake duct 16 is of special construction mounted in the intake air duct 16, preferably at a central location with respect to airstream. In the spray bar is a diffuser chamber 82 into which the final metering orifice is directed and downstream from the metering orifice is a diffuser outlet 83. The diffuser outlet 83 is made of such design that as SF flows outwardly it is diffused in all directions into the airstream to improve mixing of the SF vapor with combustion air.

On the opposite side of a partition 81 is a balance chamber 85, a portion of which may be described as an impact pressure balance chamber 86. This portion of the spray bar acts as either a pitot, static, or suction generating tube as angularly disposed, in the airstream so that dynamic forces produced by the impinging or passing air (positive, static, or negative) are communicated to the balance chamber and from the balance chamber through specifically positioned tube 87. From the balance chamber a balance line 88 fed from a port 89 in the balance chamber communicates with the second section 56 of the regulator chamber 52 through a port 90. The effect of intake air pressures on the balance line can be varied by altering the angular plane position of the aerodynamic pressure generating tube opening 87 with reference to the plane of air flow and the pressure thus established is reflected in performance of the yieldable partition 54 with a corresponding effect on the amount of opening of the valve element 63. The pressure thus communicated to the regulator chamber is integrated with the PF pressure communicated thereto through the PF pressure line 72 and piston 70. By providing a block 87' the tube 87 may be set in at the position 87" of FIG. 5, or at any intermediate position between the two, depending on the characteristics of a particular or thermodynamic system. In other words, the setting made reference to is an initial or installation setting which is dictated by the characteristics of the particular engine and fuel system in which the present invention is to be installed. Once determined and set in position neither the tube 87 nor the spray bar 80 varies in position or setting during the functioning of the supplemental fuel system of the invention.

FAIL-SAFE FEATURE

In the event of any failure in the SF system, there is provided a fail-safe accumulator 95 comprising a plenum chamber which is in communication with all possible sources of instrument or component leakage or malfunction in the SF system. For example, one fail-safe line 96 communicates between the line pressure regulator 31 and the fail-safe accumulator 95, there being a ball check valve 97 interposed in the fail-safe line. The ball check valve 97 opens to flow into the accumulator and closes against flow in a reverse direction.

Another fail-safe line 98 communicates between section 56 of the regulator chamber and the fail-safe accumulator 95. This fail-safe line is also provided with a ball check valve 99 which opens in a direction toward the accumulator 95 and closes against flow in an opposite direction.

Still another fail-safe line 100 communicates between the first section 58 of the surge chamber 53 and the fail-safe accumulator 95, this line likewise being provided with a ball check 101 opening in a direction toward the fail-safe accumulator.

Excess-flow valves, specifically rated to maximum flow outward from 56 and 58 for each thermodynamic system configuration, are provided, namely, the excess flow valve 103, in line 30' and 102 in line 88 thereby providing instant fail-safe function.

ELECTRIC CONTROL

Superimposed on the fuel system and accessory equipment heretofore described is an electric system with the aid of which the dual-fuel system becomes substantially autonomous and automatic in its operation following the closing of an ignition or main switch 105. An electric line 106 connects directly to a PF pump solenoid 107 and interconnects through an electric line 108 to a source of power such as a battery 109. Starting the PF pump results in pressurizing PF from the PF tank 10, pressurizing the PF fuel line 13 and thus feeding PF to the PF accumulator 14 for injection into the combustion chamber of the engine by whatever means may be appropriate. The fail-safe accumulator circuit is immediately activated through an electric line 110 which energizes a fail-safe pressure switch 111, normally closed.

When pressure builds up in the PF fuel line 13, as it passes to the PF accumulator 14, the pressure is set by action of a governed PF pressure switch 112, normally open. Upon reaching a specifically predetermined pressure for which the governed PF pressure switch 112 is set the switch closes, passing electric current through an electric line 113 to the PF bypass solenoid 20. When the solenoid opens the bypass solenoid valve 20, the bypass orifice 19 becomes activated and in that way establishes a specific predetermined pressure reduction in the PF line 13. Simultaneously a green signal light 115 is energized through an electric line 116. Electric energy from the battery 109 reaches the governed PF pressure switch 112 through electric lines 117 and 118 from the normally closed fail-safe pressure switch 111. By energizing the electric line 116 the functional solenoid valve 32 is energized which immediately permits SF to flow through the common SF line 30.

At start up a temperature select relay 120 is energized, this relay normally closing a circuit through an electric line 121 to an SF vapor solenoid valve 122. Action as described opens the valve permitting SF in vapor form to be drawn from the top of the SF tank 121 through the SF vapor line 27 and delivered to the common SF line 30.

Because operation of the engine has already been commenced using primary fuel, the heat exchange vaporizer 33 immediately becomes activated, and with a rise in temperature in the common SF line 30, a SF vapor temperature switch 123 is activated and when a proper temperature is reached, electric current 117 is fed to an electric line 125 and the temperature select relay 120. Action of the relay is such that when a selected temperature has been reached in the common SF line, the temperature select relay is switched to disconnect the SF vapor solenoid valve 122 and connect an SF liquid solenoid valve 126 by means of current through an electric line 127. This has the effect of cutting off the flow of SF vapor form to the common SF line and cutting in the flow of SF in liquid form through the SF liquid line 28 to the common SF line 30. Continuous use of SF tank vapor would eventually refrigerate SF liquid to normal boiling point and thereby reduce pressure to zero.

When, for any reason, there is need to disconnect operation of the SF portion of the system, there is provided a double pole double throw SF system emergency cut off switch 130. One pole 131 of the cut off switch 130 is normally open and another pole 132 is normally closed. An electric line 133 communicates with the fail-safe pressure switch 111 and also through an electric line 134 to a buzzer 135 or other type of alarm. On the other side and electric line 136 communicates through a flasher 137 with a SF low pressure warning switch 138, and from there through the electric lead 118 to the fail-safe pressure switch 111. A red signal light 141 is supplied through either an electric line 142 or an electric line 143. There is an electric line 144 through a fuse 145 feeding the pole 131 of the cut off switch from the source of power.

OPERATION

When the ignition switch 105, namely the main switch for the system, has been closed, the entire electrical circuitry becomes energized activating or making ready the control components. The PF pump solenoid 107, which is normally closed, is opened making the PF delivery system ready to start. At the same time, the PF governed pressure switch 112 circuit is alerted and when predetermined PF pressure is experienced said PF pressure switch (N.O.) is closed, thereby energizing PF bypass solenoid valve 20 (N.C.), opening same and thereby allowing PF to recirculate through the bypass orifice 19. Flow through the bypass orifice 19 proportionally reduces PF pressure delivered to the governed PF accumulator 14, which is the pressurized supply of PF for the combustion chamber. Depending on the type of engine being served, the fuel may be delivered to fuel injectors, turbine nozzles, or other components which normally supply fuel for combustion.

Energization immediately of the SF fail-safe pressure switch 111 alerts the vapor temperature switch 123 which in turn signals the temperature select relay 120 to open the SF vapor solenoid valve 122. Vapor at tank pressure then flows through the line pressure regulator 31 which reduces the pressure to a predetermined constant and substantially lower system working pressure for additional safety and system stability.

At this stage of operation it is SF in vapor form which is flowing through the common SF line 30 to the heat exchange vaporizer 33. Here, the SF temperature is raised by hot exhaust gases in the chosen embodiment, or could be raised by stack gases or coolant, etc. in another configuration, to a predetermined degree substantially above the SF boiling point. The temperature is reflected in action of the SF vapor temperature switch 123 sensor, which at that temperature, signals the temperature select relay 120 to close the SF vapor solenoid valve 122 and simultaneously open the SF liquid solenoid valve 126. At this stage SF in liquid form flowing through the common SF line 30 is regulated as to pressure by the line pressure regulator 31, continues flowing through the functional solenoid valve 32 which was initially open when predetermined operation pressure was attained and, flowing into the heat exchange vaporizer, is converted to SF in vapor form. This being the case, it will be clear that functioning of components downstream from the heat exchange vaporizer 33 is always in response to SF in vapor state whether at start up of the operation or subsequent thereto.

As the SF in vaporized state at a pressure determined by the line pressure regulator 31 reaches the pressure responsive regulator 34, the pressure is proportionally and specifically varied in response to action of the piston 70 which is motorized by variations in manifold pressures or governed pressures present in the governed pressure PF accumulator 14 in response to pressure generated by the primary fuel pump 12.

It is significant that SF regulated as to pressure, as has just been described, passes through the temperature equalizer 35 which is located in the intake air duct 16, and at that point the temperature of SF is either reduced or increased as the case may be until it is substantially equal to the temperature of air which is drawn into the intake air conduit 16 upstream of the final metering orifice for ultimate consumption in the combustion chamber of the engine. As SF immerges from the final metering orifice 36 and through diffuser outlet 83, it is at the same temperature as the incoming air, thereby eliminating SF to air ratio density variations.

Because of the fact that the pressure of air in the intake air duct 16 may vary due to any one of a number of reasons, the balance line 88 has been provided. Pressure differentials thus arising, if not provided for, would create a false demand substantially affecting the SF supply and metering values. As has been previously noted, pressure in the balance line integrates with action of the piston 70 caused by pressure in the PF portion of the system, to alter the proportioning of SF as it passes through the pressure responsive regulator 34.

It should be noted that the spray bar has a true streamline aerodynamic configuration both downstream with respect to the mounting 81 and upstream of the mounting where the shape provides for a pitot tube effect.

As dynamic or impact pressure induced by the angular disposition of the tube 87, traveling through the balance line 88 is experienced by the flexible partition 54, SF pressure is varied accordingly. This dynamic pressure resultant may be varied from q (impact pressure) downward through static $(0.0_q)$ to a factor of $-0.9_q$ by means of pre-positioning the tube 87 at a different angle which means that the pitot opening is shifted from a plane perpendicular to the air flow to a plane at an angle to the air flow, thereby, throughout that range, providing an exceptionally broad spectrum of adjustment and control. Once set for the characteristics of a particular engine, the spray bar 80 and accompanying tube 87 remain fixed in position and are not thereafter shiftable.

The governed PF pressure switch 112, normally open, is preset to close at any specific pressure generated by the fuel pump 12, that is to say above idling speed, or any thermodynamic system pilot burning stage. Action of the switch opens the functional solenoid valve 32, the result of which is to expose the piston 70 to variations of governed PF system pressures in accord with the nature of the work being performed by the system. As the pressure switch 112 makes and breaks its circuit, the green light 115 illuminates correspondingly.

Lowest working pressures in the SF portion of the system occur during operation. They exist specifically in that portion of the system between the final metering orifice 36, and the pressure responsive regulator 34 containing as it does the regulator chamber 52 and surge chamber 53.

The fail-safe pressure switch 111 is preset to switch to normally on position when exposed to pressures only marginally above those predetermined as maximum within the system. All regulating, controlling, and balancing components which could conceivably vent flammables to atmosphere or, in excess to the thermodynamic system, are ducted through the fail-safe lines 96, 98, 100 with their respective ball check valves to the fail-safe accumulator 95. The fail-safe pressure switch 111 reads the pressure and if, for any reason, finds it excessive, energizes that portion of the system, cutting off the entire SF supply and its PF adjuncts, in consequence restoring operation to full PF.

The action described energizes the buzzer 135 and illuminates the red light 141. When these signals are adhered to, the operator throws the manual SF system emergency cut off switch 132 from the solid line position shown to the dotted line position. This means that the pole 132 is shifted from on to off position, and the pole 131 from off to on position by reason of a bridge 146 causing them to act simultaneously. Throwing the cut off switch as described de-energizes the buzzer or alarm 135, and disconnects the entire SF system, including the fail-safe component and PF bypass system and reconnects the red light 141 directly to the battery 109 through the fuse 145. As a consequence there is a red warning signal which remains activated until necessary service has been performed.

As an insurance against malfunctioning should the supply of SF run low a pressure warning switch 138 and flasher 137 is provided. A low pressure condition activates the normally open warning switch 138 causing it to close and energize the flasher 137. This is a signal to the operator to activate the manual emergency cut off switch 30 and return the system to full PF operation.

Referring to FIG. 1, there are excess-flow valves capacitated to each family of engines and each thermodynamic system configuration. To further enhance the safety of the system and give positive assurance to the fail-safe mechanism one minimal flow excess-flow valve 102 is used to check any appreciable outflow from the regulator 56 through the balance line 88 into the balance chamber of the spray bar through orifice 89. Another excess flow valve 103 is capacitated to shut off at any flow in excess of 10% above minimum specified for its particular system and is positioned in SF line 30' to the spray bar.

The supplemental fuel system herein disclosed is equally adaptable to operation with a conventional combustion engine of the type using gasoline, with some minor relocation of controls and accessories. As shown in FIG. 2, FIG. 2a and FIG. 4, the primary fuel tank 10 feeds through the primary fuel (PF) line 11 to a standard automotive fuel pump 160 and from the fuel pump 160 through a PF extension line 161 to a carburetor 162. An electric line 159 from the ignition switch 105 activates the fuel pump. The carburetor, following conventional construction, is in communication with the passage 17 of the intake air duct 16. The passage 17 then feeds into an intake manifold 163. As is customary for such a combustion engine there is provided a throttle 164, here shown in the form of a butterfly valve pivoted at the point 165, and subject to conventional throttle control (not shown).

A control pressure line 166 communicates between the intake manifold 163 and a cylinder 169' which accommodates a piston 170'. A relatively light spring 171 acts between the piston 170' and the yieldable partition 54 in the same manner as heretofore described. There is, in addition, a second relatively heavy spring 172 which acts between the opposite side of the piston 170' and a bottom wall 173 of the cylinder 169'. A spring is only one means of establishing differential reciprocating motor forces since a comparable result could, for example, be accomplished by use of a differential piston.

As a secondary consideration there may be provided in this system a yellow low level secondary fuel warning system light 176 connected by an electric line 175 to the electric line 136. A temperature selecting relay 180 includes a two pole switch 181 in which a normally closed pole communicates between the electric line 106 from the ignition switch 105 and an extension line 182 which supplies a main PF solenoid valve 183.

A normally open pole of the two pole switch 181 is connected to an electric line 184 serving a PF bypass solenoid valve 185 in a PF bypass fuel line 186. The bypass fuel line 186 joins the PF extension line 161 at a T fitting 187. In the bypass line is a PF pressure reduction regulator 188 downstream of the PF bypass solenoid valve 186.

A relay energizer 190 is connected through an electric line 191 to a SF pressure sensitive switch 177 and the green light 115. The functional solenoid valve 32 in the SF common line 30 is electrically connected by an electric lead 193 to the source of electric power.

Although the supplemental fuel system feeds into the combustion air intake passage in substantially the same fashion as heretofore described, there are additional factors. In conventional operation the intake manifold 163 at some stages of operation has a positive pressure condition and other occasions a negative pressure condition. There will in consequence be a corresponding pressure condition exerted on the piston 170' in the cylinder 169'. A positive pressure normally shifts the piston in a direction from left to right against the flexible partition 54 thereby to increase the flow of secondary fuel (SF). Conversely, a negative pressure or vacuum condition causes the piston 170' to move in a direction right to left with a corresponding movement of the flexible partition 54 to decrease the SF flow. Movement of the piston 170' in a direction from right to left is resisted by the relatively heavier spring 172. The lighter spring is a cushion between the diaphragm and the piston. The diaphragm is always pushing against the piston and when the heavier spring reaches free length the device is back in the same situation as the diesel configuration. As the pressure condition increases in the cylinder 169' the heavier spring moves the piston 170' from left to right to its free length against the cushion effect of the relatively lighter spring 171 and the flexible partition 54. With gasoline as the PF and propane, for example, as the SF, the electric line 191 in which is the SF pressure switch 177, energizes the green light 115. The functional solenoid 32, temperature select relay 120 together with the SF vapor solenoid valve 122, and SF liquid solenoid valve 126 are connected in the system and operate in the same manner as has been previously described to vary the supply of SF in the various optimum ratios called for by delivery of PF, this time to the intake manifold, instead of the governed pressure PF accumulator as was the case when diesel fuel was the PF. Intake manifold pressures provide the precise force parameters for fuel-to-fuel vs. air ratio requisites.

In the gasoline fuel system of FIGS. 2, 2a and 4 when the ignition switch 105 is closed and the engine started the fuel pump 160 is activated and the solenoid valve 183 is opened sending PF to the carburetor. At the same time gaseous SF is passed to the system as has been heretofore described by opening of the functional solenoid valve 32.

In just a few moments, 15 seconds more or less, the heat exchanger attains vaporization temperature of SF in the line 30 and the vapor temperature switch 123 signals a switch to liquid SF by way of the temperature select switch 120 and the SF liquid solenoid valve 126.

At the same time the relay energizer 190 is activated throwing the temperature select relay 180 to the second position. This deactivates the solenoid valve 183 cutting off PF from the pump to the carburetor and opens the solenoid valve 185 of the PF bypass line 186 whereupon the pressure of PF is appropriately reduced by action of the pressure reduction regulator 188 to conform to optimal "dual-fuel" operation.

In this form, by way of example, a low SF level warning relay 137a communicates with and trips the fail-safe accumulator 95.

Should the SF, for example, be some other fuel such as methanol, some changes in components are needed for both the diesel system and the gasoline system.

For methanol there is provided a substantially conventional automotive electric fuel pump 195 in the common supplemental fuel line 30 which takes the place of the line pressure regulator 31, previously described as being at that location, and an electric line 159' in communication with the ignition switch 105 to energize the fuel pump 195.

The temperature select relay 120 is omitted as are also the SF vapor solenoid valve 122 and SF liquid solenoid valve 126. A temperature responsive solenoid valve 197 replaces the functional solenoid valve 32 in the SF line 30, and is connected by an electric line 191' to the electric line 191.

When the secondary fuel, for example, is methanol some added limitations need to be taken into consideration, among which is the substantial affinity of methanol for water. To accommodate this a SF tank 21' may be provided with an inflatable bag 199 equipped with an accompanying breather valve 200. The stand pipe 26' for liquid secondary fuel extends through an accordian tube 201 as previously described to the bottom of the tank 21'. With the tank equipped in this fashion only atmospheric air will displace fuel taken from the tank. Conversely, as the tank is refilled the inflatable bag 199 will deflate and expend only air into the surrounding atmosphere. By appropriate means the deflatable bag 199 may be made to accommodate the position of the stand pipe 26' throughout changes in level of the liquid fuel.

Further, when methanol is the SF, the fail-safe feature may be dispensed with because methanol is supplied by pump pressure which is a specifically preset relatively low pressure.

In operation of the last disclosed form of the invention, the SF fuel pump 195 is energized when the ignition switch 105 is closed. The temperature responsive solenoid circuit is energized at the same time. The same action takes place whether the system as in FIG. 1 is set up for diesel operation or as in FIGS. 2, and 4 for gasoline operating as the primary fuel.

In FIG. 6 where there is a PF manifold 205 for fuel injectors 206, they are supplied from a PF line 207 from the T fitting 187. The carburetor in this set up is omitted. Otherwise the modified system of FIG. 6 operates in the same fashion as does the gasoline PF system of FIGS. 2, and 4.

Although in the first instance the PF has been referred to as diesel and in the second instance gasoline, it may well be that on other occasions the PF may be propane, methanol or other suitable combustible and the SF a fuel such as gasoline, diesel or other suitable combustible or chemical agency.

In the dual-fuel system herein disclosed, the result of introducing propane into the airstream and compressing it with the air to a sufficiently high temperature will cause auto-ignition of the diesel fuel being injected near top dead center without first auto-igniting the propane, methane, or other suitable SF in air mixture. This appears to achieve better and more complete combustion of the diesel fuel. Various aspects of improvment are the result. So, also, with a multiplicity of combinations of primary and one or more supplemental agencies.

Visible free carbon is not present in the exhaust gas even at power increases of more than 35% above diesel capabilities. This is evidence that all the carbon in the hydrocarbon fuel has been oxidized to $H_2O$ and to $CO_2$.

Lubricating oil analyses shows normal color and no dilution even after 60,000 miles of operation of a vehicle so equipped. Ordinarily diesel lubricating oil turns black within 1,000 miles. This indicates that the combustion process goes further toward controlled completion and the fuel's carbon is oxidized to $CO_2$ and is not forced down into the crankcase to contaminate the oil. Further, this phenomenon indicates marked decrease in piston and associated oil temperatures.

Exhaust temperatures are substantially lower for the same power output at the wheels. This means that the total fuel burned, i.e. propane and diesel fuel, delivers more useful heat to the engine in the form of usable pressure on the pistons and less heat is rejected or lost to the exhaust pipe. Obvious elimination of obdurate, jagged peaks in flame pattern and consequent substantial reduction of peak pressures and temperatures attendant to typical CI combustion characteristics results from the operation.

Power is measurably increased when the propane gas is introduced and diesel fuel commensurately reduced, which can only be accounted for by releasing more heat energy from the liquid diesel fuel droplets which have to volatilize before their vapor and air can auto-ignite. The propane acts as an intermediary enriched air to bridge the gap between the first heavy fuel to ignite and the largest and heaviest droplets that have very little time to volatilize and reach a combustible mixture while trying to find any remaining air with which to carry out a continuous burning process.

Economy is directly affected whenever the total amount of liquid fuel is more completely burned. It has been confirmed in regular service that the sum of the liquid fuel energy and that of the propane gas energy does not simply equal the power resultant, but exceeds the expected sum of total energy by a substantial amount.

The diesel engine, taken as an example, is an air engine, in which a full charge of intake air is drawn into each cylinder as the piston descends and is compressed as the piston rises. When air is compressed, the air molecules are squeezed closer together and the work of compression is evidenced by the rise in temperature of the air, being highest at top center. This temperature is higher than the automatic temperature at which some of the liquid fuel in the form of tiny droplets and their vapors will ignite and burn, any place throughout the combustion chamber.

When air and a combustible gas, or vaporized liquid fuel, are compressed, the mixture is raised in pressure and temperature, causing precombustion reactions between the oxygen in the air and the carbon and hydrogen of the gaseous fuel. This reaction speeds up if the compression ratio is higher or the speed increases. Some combustible gases react violently beyond a certain point and increase in pressure prior to any evidences of combustion. Other gases have a greater stability and do not produce abnormal pressures prior to the normal conditions for the main injected fuel to self ignite.

The diesel or compression-ignition (CI) cycle has no one point of ignition, such as provided by a spark plug in an otto-cycle or spark-ignition (SI) engine. It can ignite at any location within the combustion chamber, wherever there is a combustible mixture that has reached its self ignition temperature. If the diesel configuration has a 15:1 compression ratio, its heat of compression will be lower than another diesel with 22:1 compression ratio. The spark ignition engine's burning process wherein the last fuel to burn reaches its spontaneous ignition temperature and explodes after top dead center. That is, heat is released in essentially zero time, with consequent loss of power transmitted to rotation of the crankshaft.

In the compression ignition or diesel engine, the air is compressed to a very high temperature, approaching 1,000° F. and fuel is then injected at very high pressure as a conical spray into a highly turbulent combustion chamber with air at about 16 atmospheres pressure (235 psig). The spray acts as an air mixer and draws hot air into the spray pattern. At the same time the temperature and pressure of the air drops as evaporation takes place and also as vapors from the fuel droplets are "pre-oxidized" by the oxygen of the surrounding air to create local points of combustible mixtures. Immediately then explosive burning takes place in many places until the fuel is consumed by the air which is in excess. Therefore, unlike the spark ignition engine which starts the ignition of a homogeneous mixture of gasoline and air at a much lower temperature and pressure, and proceeds to burn with a flame front all the way to the furthest reaches of the combustion chamber, and the last fuel to burn might be exploded at 50° after top center, while the "diesel knock" will have begun before top center.

It has been determined that the auto-ignition temperature of paraffinic hydrocarbons (formula $C_n H_{2n+2}$) increases as molecular weight increases. Thus, propane ($C_3 H_8$) will resist high temperature self ignition in compressed air better than either methane ($C H_4$) or ethane ($C_2 H_6$). Both $C H_4$ and $C_2 H_6$ fall well within the scope of SF's along with methanol.

Since the diesel engine ignition cycle is characterized by the auto-ignition of the diesel fuel spray, diesel fuel will have to be injected every time the piston comes up on the firing stroke. If, however, propane is desired for idling in conjunction with PF as well as for cruise and power, then for the same road or engine speed, less total of both fuels is needed if propane fulfills part of the energy supplied.

Tests show the superiority of propane as an "activator" or combustion "enhancer" or, in the view of some theorists "synergistic agency" in producing more complete and economical energy release from diesel fuel potentially and SI fuels as well in that more complete combustion occurs. For example: exhaust smoke is stopped; exhaust temperature is reduced; total fuel consumption is reduced; lubricating oil remains cleaner; and diesel knock is modified to a quieter combustion.

The system, moreover, is such that the supplemental contribution may be that of a supporting agency only, without itself being a source of energy, but serving to produce a more efficient combustion of what is then the sole fuel supply, under the control and monitoring effect of the system.

Figure 7:
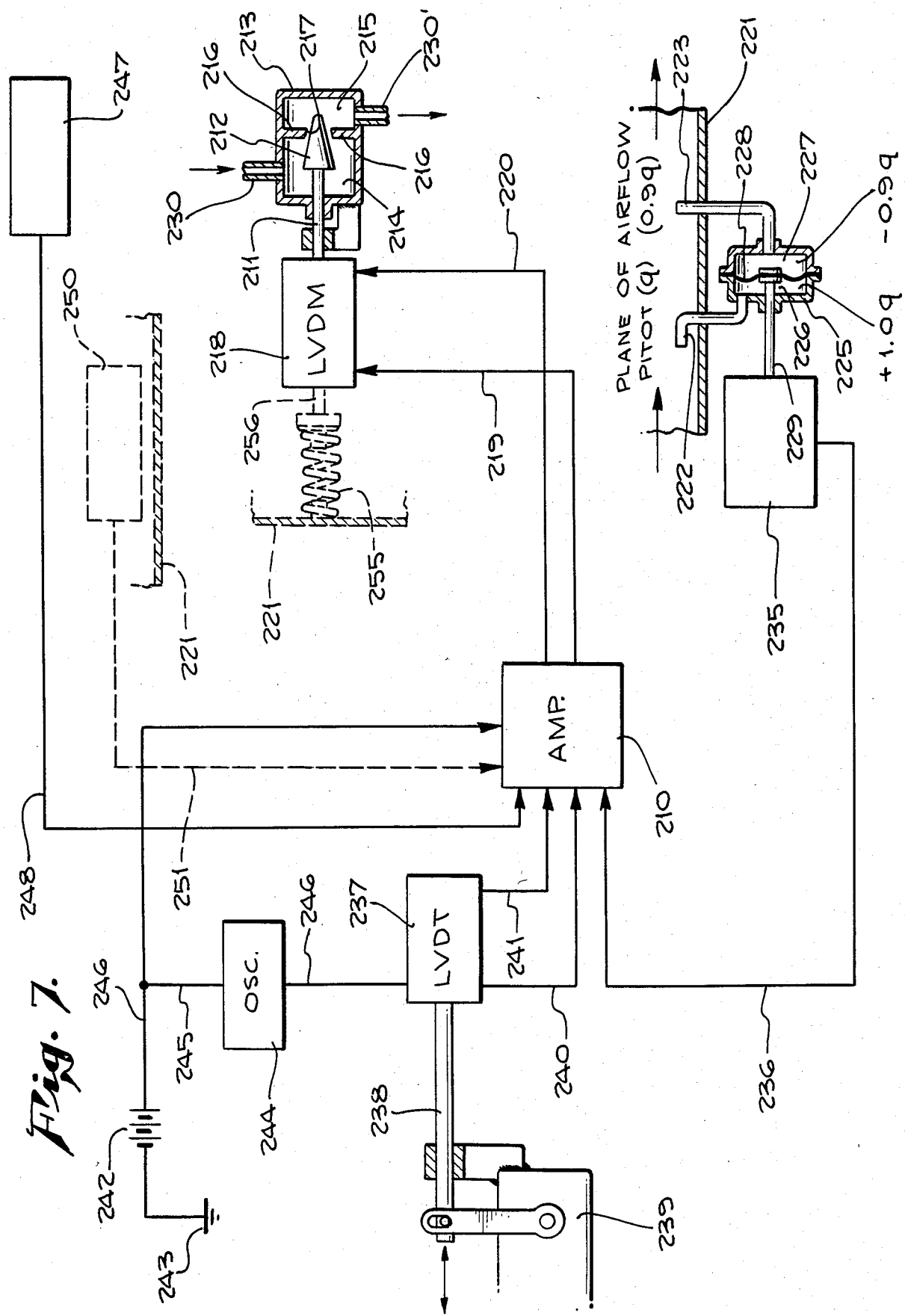
FIG. 7 is a schematic diagram of another form of the invention with a different actuator for controlling the supplemental flow.

In the embodiment of the invention of FIG. 7, the automatic compensating means for regulating the flow condition of the supplemental delivery means takes the form of what may be aptly described as an integrator 210. In the instance of FIG. 7, the integrator is an electric multi-channel amplifier. The integrator 210 accepts inputs from a variety of sources ultimately translating such inputs into longitudinal movement of a valve stem 211 on which is mounted a valve element 212. The valve element is contained within a valve housing 213 into which extends the supplemental delivery line 230 and from which extends the line 230' which ultimately makes delivery to the combustion air supply. There is an inflow chamber 214 separated from an outflow chamber 215 by a partition 216 in which is a valve seat 217 for cooperation with the valve element 212.

The valve element 212, through its stem 211, is motivated by a linear variable differential motor (LVDM) 218 supplied by electric leads 219 and 220 from the integrator 210.

Among the influences which feed into the integrator 210 is the flow of combustion air in a combustion air passage 221. To sample the flow of air, there is provided a pitot tube 222 facing upstream acting in concert with a tube 223. Within a casing 225 is a high pressure chamber 226 separated from a low pressure chamber 227 by a diaphragm 228. The difference in pressure is determined by the relative positioning of the two tubes which set up a differential pressure on opposite sides of the diaphragm proportional to the flow of combustion air through the passage 221. A stem 229 on the diaphragm provides variable linear motion to an appropriate conventional potentiometer or pressure transducer 235 where linear motion is converted to electrical energy emerging through an electric line 236, thence passing to the integrator 210.

A linear variable differential transformer (LVDT) 237 is actuated by a reciprocating shaft 238. The shaft 238 may be motivated, for example, by a governor 239 of a diesel engine. The mechanical motivating movement, however, may also originate in a rack or other mechanical means, as for example an accelerator pedal, the movments of which reflect the flow or desired flow through the primary delivery means for fuel, such as diesel fuel to a diesel engine. Reciprocating movement of the shaft 238 within the LVDT 237 is converted into electric energy emerging through electric lines 240 and 241 to the integrator 210.

In a system such as that made reference to where the electric supply may originate in a battery 242 grounded at 243, there may be provided an oscillator 244 fed by an electric line 245 to convert direct current to alternating current supplied through an electric line 246 to the LVDT 237. Another electric line 246 from the battery 242 supplies current to the integrator 210. There may also be provided a potentiometer load cell or added LVDT 247 communicating with the integrator through an electric line 248.

In an arrangement of the system as described, changes in the flow of combustion air through the combustion air chamber 221 are delivered electrically to the integrator 210 as are also changes in the primary delivery means, where their combined effect is amplified and the resulting electric energy is supplied to the LVDM 218. The motor acting on the valve element 212 meters the flow through the supplemental delivery means by changing adjustment of the valve element 212. In this way the supply of supplemental agency, be it fuel or some other agency, or a catalyst, is varied in accordance with variations in the primary fuel as well as in the combustion air supply.

Still additional controls may be fed into the integrator as desired. For example, the temperature of air in the combustion air supply flowing through the combustion air passage 221 may be sampled by a thermocouple 250 converting the effect into an electric energy charge traveling through an electric line 251 to the integrator 210. Acting in this fashion, the flow through the supplemental delivery line is modified by reason of the temperature condition of the combustion air supply to an extent comparable to employment of the temperature equalizer 35 described in connection with FIG. 1.

As still a further alternative for moderating the flow through the supplemental delivery system by reason of temperature changes in the combustion air passage 221, there may be provided a bi-metal heat sensor spring 255 acting an a core 256 which forms part of the LVDM 218, thereby to modify the motivating effect of the LVDM 218 produced by the electric energy imparted to it by the integrator 210.

Further having reference to the potentiometer load cell 247 previously described, such a device might also be attached to the throttle of a motor vehicle provided with an LVDT as a means of securing a temporary surge or "punch" of the supplemental agency when initiating an accelerating cycle.

Figure 8:
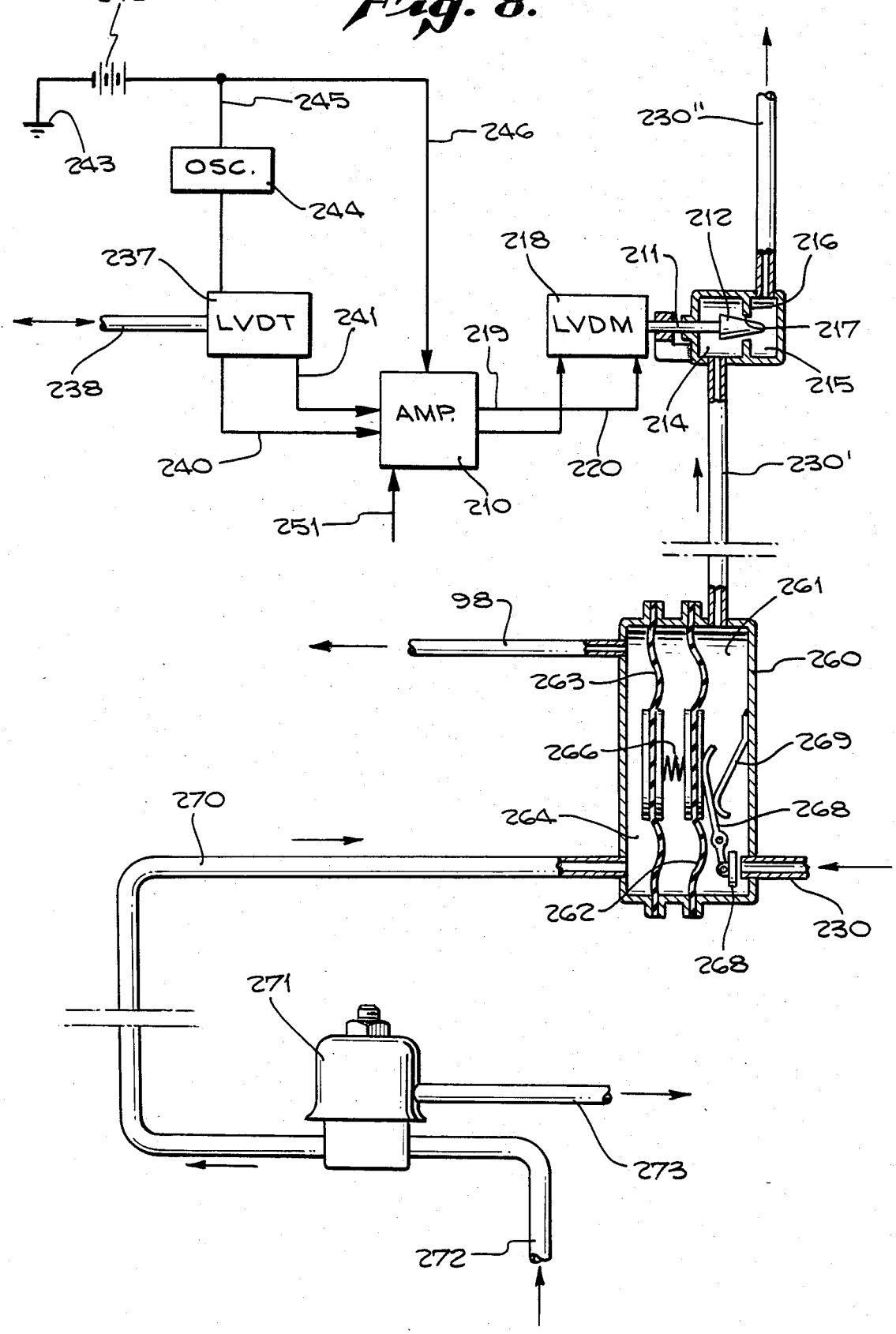
FIG. 8 is a schematic diagram of the invention set up to accommodate conditions of turbo charging.

In the form of invention of FIG. 8, the system is augmented in order to accommodate what are commerically known as turbocharged diesel engines.

The significant portion of the system of FIG. 8 is in effect an adaptation of the pressure responsive regulator 34 of FIG. 3 coupled with the integrator 210 of FIG. 7. As shown, there is a jacket 260 within which is a first chamber section 261, one wall of which is formed by a yieldable partition 262. A second yieldable partition 263 assists in forming a second chamber section 264. The two yieldable partitions form a third chamber section serving as an air cushion 265. For a positive separation there may be additionally provided a spring 266. In this case the supplemental delivery line 230 communicates with the first chamber section 261, passing a valve element 267 motivated by a linkage 268 spring-pressed against the yieldable partition 262 by a cantilever spring 269. The supplemental delivery outlet line 230' communicates with the valve housing 213 in which operates the valve element 212 serving as a metering valve as heretofore described. The supplemental outlet line emerges from the valve housing as line 230".

In this form of the system, a balance passage or line 270 supplies the second chamber section 264 with fluid pressure derived from a conventional pressure regulating and compensating device 271. The pressure regulating and compensating device 271 is supplied by a primary fuel pressure passage or line 272 and a combustion air pressure passage or line 273. Pressure in the passage 272 reflects pressure present in the primary delivery means. Pressure in the passage 273 reflects the combustion air pressure when under the influence of turbocharging.

In operation, when the system is not being subjected to turbocharging, the pressure regulating and compensating device 271 will merely reduce pressure in the line 272 to a relatively low pressure approaching atmospheric, in other words slightly above pressure in the supplemental delivery line 230. Under turbocharging conditions, pressure present in the combustion air supply line is increased to double or more that of atmospheric pressure. This large increase in pressure passing through the combustion air passage 273 to the pressure regulating and compensating device 271 serves to increase the outflow of pressure in the balance passage 270 by a corresponding amount. Consequently the yieldable partition 263 will move a greater distance causing a corresponding greater movement of the yieldable partition 262 which will result in opening the valve element 267 to a greater degree, thereby permitting the greater flow of the supplemental agent.

Irrespective of the flow thus modified through the jacket 260 and supplemental delivery line 230', this flow is further modified by action of the integrator 210 as required, for example, by changes in the primary delivery means exemplified in movement of the reciprocating shaft 238 or by temperature variations in the combustion air supply fed to the integrator 210 through the electric line 251. The integrator 210 may, of course, be made subject to the same varying conditions as have been described in connection with FIG. 7.

Since it is an essential purpose of the automatic compensating means to modify the flow through the supplemental delivery means, another location for the metering valve is feasible, namely in the bleed line 98. In such a location, motivated by the LVDM 218 by the same means as heretofore described, changing the bleed capability will vary the pressure in the second chamber sections 264 on the corresponding side of the yieldable partition 263. The result is a change in setting of the valve element 212 whereby to correspondingly vary the flow in the supplemental delivery means.

Figure 9:
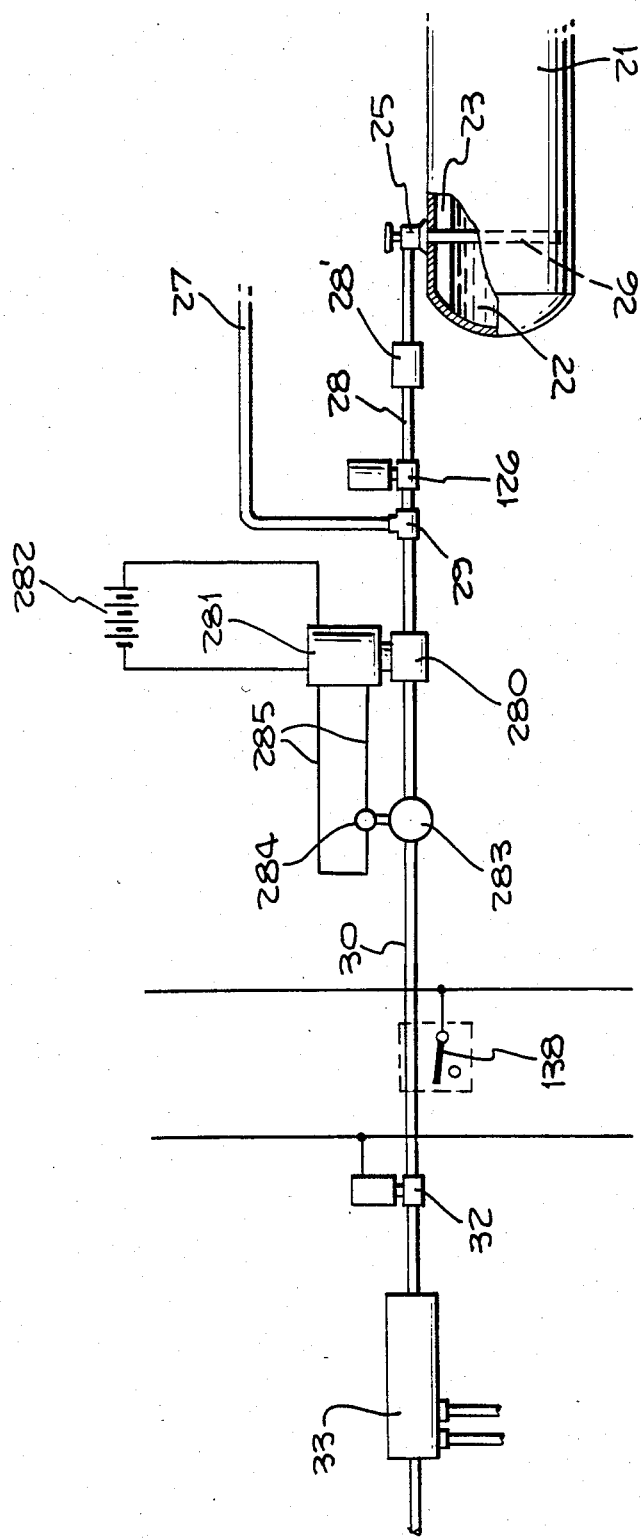
FIG. 9 is a fragmentary schematic diagram of a portion of FIG. 1 containing a modified form of pressure booster.

In the form of the invention as shown in FIG. 9, a booster pump 280 for supplemental fuel is located in the supplemental fuel line 30. A motor 281 for the booster pump derives its D.C. power preferably from a battery 282. To activate the motor there is provided a pressure responsive actuator 283 in the supplemental fuel line 30 downstream of the booster pump 280. The actuator is mounted to operate an electric switch 284 in a circuit 285 whereby to energize the motor 281.

Under circumstances where, for example, turbo manifold pressure approaches ambience, i.e., a cold condition, there is an induced pressure drop of liquid petroleum gas which is carried into the supplemental fuel line 30. This would be expected to result in a pressure of about 65 p.s.i., causing the pressure responsive actuator to close the normally open switch 284. The motor being energized activates the booster pump 280 to raise the pressure to a preferred level of about 85 p.s.i.

While particular embodiments of the present invention have been shown and described, it will be obvious to those skilled in the state of the art that changes and modifications may be made without departing from the invention in its broader aspects, and therefore, the aims of its appended claims is to cover all such changes and modifications as fall within the true spirit and scope of this invention.

Having described the invention, what is claimed as new in support of Letters Patent is as follows:

1. A supplemental fuel system for an engine which has a combustion chamber, a conduit thereto for a flowing combustion air supply, a primary source for primary fuel, primary delivery means between said primary source and said combustion chamber, and primary fuel pressure means for said primary delivery means, a supplemental source for a supplemental fuel agency including a supplemental delivery means between said supplemental source and said air supply, and an automatic flow control means in said supplemental delivery means for establishing an initial open flow condition therein, a temperature moderator for said supplemental delivery means responsive to temperature of said air supply for moderating the temperature of said supplemental fuel agency, a main electrical circuit for said primary fuel pressure means having an ignition switch therein, adjusting means in said electrical circuit for establishing flow conditions in said primary delivery means and automatic compensating means for regulating the flow condition in said supplemental delivery means reponsive to the flow condition in said primary delivery means.

2. A supplemental fuel system as in claim 1 wherein there is a heat exchanger for said supplemental delivery means, said heat exchanger being at a location operationally removed from said primary delivery means.

3. A supplemental fuel system for an engine which has a combustion chamber, a conduit thereto for a flowing combustion air supply, a primary source for primary fuel, primary delivery means between said primary source and said combustion chamber, and primary fuel pressure means for said primary delivery means, a supplemental source for a supplemental fuel agency including a supplemental delivery means between said supplemental source and said air supply, and an automatic flow control means in said supplemental delivery means for establishing an initial open flow condition therein, a temperature moderator in said supplemental delivery means responsive to temperature of said air supply for moderating the temperature of said supplemental fuel agency, a main electrical circuit for said primary fuel pressure means having an ignition initiator, adjusting means in said electrical circuit for establishing flow conditions in said primary delivery means and automatic compensating means for regulating the flow condition in said supplemental delivery means responsive to the flow condition in said primary delivery means, a heat exchanger for said supplemental delivery means, said heat exchanger being at a location operationally removed from said primary delivery means, said flow control means comprising a pressure regulator and said supplemental source having an integral gas containing portion and a liquid containing portion, a feed line from each said portion to said supplemental delivery means, a sensor in said electric circuit responsive to temperature in said heat exchanger, and a valve control in said electric circuit for each said feed line selectively responsive to said sensor whereby to deliver in the alternative gaseous or liquid fuel to said supplemental delivery means in response to demand by said sensor.

4. A supplemental fuel system as in claim 3 including a preset pressure sensitive switch in said primary fuel delivery means responsive to said pressure means, a bypass line from said primary delivery means to an inflow side of said primary fuel pressure means, a bypass valve in said bypass line having an electric operated control responsive to said pressure sensitive switch and a bypass primary fuel line between said primary delivery means and an inflow side of said pressure means whereby to preset the operating pressure of primary fuel at said combustion chamber.

5. A supplemental fuel system as in claim 4 including an electrically operated functional valve in said supplemental delivery means intermediate said heat exchanger and said supplemental feed lines, said functional valve being responsive to said pressure sensitive switch whereby to modify the flow of supplemental fuel in proportion to the pressure condition of the primary fuel at the combustion chamber.

6. A supplemental fuel system as in claim 4 including a visual electric signal device electrically connected with said pressure sensitive switch whereby to signal the operative condition of said pressure sensitive switch and said supplemental fuel system.

7. A supplemental fuel system as in claim 5 including an intermittent electrically operated warning signal device electrically connected with said pressure sensitive switch and said electrically operated functional valve having an actuated condition in response to a condition where insufficient supplemental fuel is being supplied by said supplemental delivery means.

8. A supplemental fuel system as in claim 3 including a control orifice fitting in said bypass line having a setting determinative of the operating pressure in said primary delivery means.

9. A supplemental fuel system as in claim 38 wherein there is a pressure responsive regulator having a regulator chamber including a pressure responsive means, said pressure responsive means including a yieldable partition in said chamber, a first section on one side of said chamber, a supplemental delivery orifice to said first section in communication with said supplemental delivery means, and a regulator valve for said supplemental delivery orifice responsive to said pressure responsive means, a second section of said chamber on the other side of said partition, a control pressure line in communication between said primary delivery means and said second section of the chamber whereby to vary the pressure and flow of said supplemental fuel vapor in response to changes in pressure in the primary delivery means.

10. A supplemental fuel system as in claim 9 wherein said pressure responsive means comprises a cylinder in communication with said control pressure line and having a piston or other reciprocating motor reciprocatably mounted therein, and a resilient spring element acting between said piston and said partition.

11. A supplemental fuel system as in claim 9 including a surge chamber in communication with said first section downstream of said secondary delivery orifice, one wall of said surge chamber being yieldable.

12. A supplemental fuel system as in claim 9 including a pressure balance line having one end in communication with said second section and the other end in communication with said air supply.

13. A supplemental fuel system as in claim 9 including a diffuser mounted in said air supply, said diffuser comprising a diffuser chamber having an outlet directed downstream of said air supply and an inlet in communication with said secondary delivery means downstream of said pressure responsive regulator.

14. A supplemental fuel system as in claim 13 wherein said diffuser includes a balance chamber having an air pressure orifice in communication with said air supply and having a connection to said second section.

15. A supplemental fuel system as in claim 9 wherein there is a supplemental fuel discharge outlet in said air supply, a pressure responsive tube having a selectively fixed orientation in said air supply relative to the flow of air therein, and an air pressure balance line in communication between said tube and said second section.

16. A supplemental fuel system as in claim 15 wherein there is a tube support member in said air supply and means for securing said tube support member in said air supply at a selected angular orientation relative to the flow of air in said air supply to comply with individual operating characteristics of the engine.

17. A supplemental fuel system as in claim 15 wherein there is a balance member having a true streamline airfoil configuration located in said air supply and having a balance chamber therein, said pressure responsive tube being located in said balance member and in communication between said balance chamber and said air supply, there being means for securing said pressure responsive tube in a selected angular orientation with respect to the flow of air in said air supply.

18. A supplemental fuel system as in claim 3 wherein there is a fail-safe assembly comprising an accumulator having an accumulator chamber for excess supplemental fuel pressure, a fail-safe branch line from said line pressure regulator to said accumulator chamber, and a check valve in said branch line opening for flow to said accumulator chamber.

19. A supplemental fuel system as in claim 18 wherein there is a fail-safe preset excess pressure switch responsive to activation of said accumulator and an electric warning means in circuit with said fail-safe pressure switch whereby to signal a failure producing excessive pressures in said supplemental fuel means and simultaneously cut off all supplemental fuel supply solenoid valves together with all pertinent function of said SF introduction system and at the same time thereby restoring full PF operation.

20. A supplemental fuel system as in claim 18 wherein said warning means is an electric audible warning device in conjunction with a warning light in circuit with said fail-safe excess pressure switch whereby to signal a failure in said supplemental delivery system and simultaneously cut off all supplemental fuel supply and delivery solenoid valves together with supplement fuel introduction system components and at the same time restore the system to maximum primary fuel operation.

21. A supplemental fuel system as in claim 19 wherein there is a low pressure warning switch and a low pressure signal in circuit with said fail-safe pressure switch whereby to signal a low fuel supply condition in said supplemental delivery means.

22. A supplemental fuel system as in claim 19 wherein there is a manual cut off switch in circuit with said fail-safe pressure switch, excess supplemental fuel pressure means circuited so as to permanently cut off the entire supplemental fuel system, cut off the fail-safe warning and energize an individually circuited telltale warning signal which indicates a cut off condition until system is appropriately serviced.

23. A supplemental fuel system as in claim 11 wherein there is a fail-safe assembly comprising an accumulator having an accumulator chamber for said supplemental fuel, a fail-safe branch line from the line pressure regulator to said accumulator chamber, a branch line from said first section of the regulator chamber to said accumulator chamber, a branch line from said surge chamber to said accumulator chamber and a check valve in each branch line open for flow into said accumulator chamber.

24. A supplemental fuel system as in claim 1 wherein said primary fuel pressure means includes an electric actuator and wherein there is a fuel pump in said supplemental delivery means and said flow control device in said supplemental delivery means is a solenoid valve responsive to temperature of said supplemental fuel in its delivery means at a location downstream of said fuel pump.

25. A method for the continuous proportional mixing of a primary fuel and supplemental fuel in a combustion engine supply system comprising initiating by electric means a supply of primary fuel for starting combustion, then by electric means automatically initiating a supply of supplemental fuel to the combustion air supply for the engine in response to a variation in pressure of the primary fuel, then using variations in the flow of supplemental fuel to automatically vary by electrical means the flow of primary fuel and constantly balancing automatically the relative flow of the two fuels for optimum efficiency of operation of the combustion engine.

26. A method for the continuous proportional mixing of a primary fuel and supplemental fuel in a combustion engine supply system comprising initially by electric means initiating a supply of primary fuel for starting combustion, then by electric means automatically initiating a supply of supplemental fuel to the combustion air supply for the engine in response to a variation in pressure of the primary fuel, then using variations in the flow of supplemental fuel to automatically vary by electrical means the flow of primary fuel, constantly balancing automatically the relative flow of the two fuels for optimum efficiency of operation of the combustion engine, heating the supply of supplemental fuel by heat generated by combustion of fuel in the combustion engine and regulating the temperature of secondary fuel to match ambient temperature.

27. A method for the continuous proportional mixing of a primary fuel agency and supplemental fuel agency in a combustion engine supply system comprising initiating by electric means a supply of primary fuel agency for starting combustion, automatically initiating by electric means a supply of supplemental fuel agency to the combustion air supply for the agency to vary by electrical means the flow or primary fuel agency, constantly balancing automatically the relative flow of the two fuel agencies for optimum efficiency of operation of the combustion engine and adjusting the temperature of the supplemental fuel agency to a temperature compatible with the temperature of the air supplied for combustion in the engine.

28. A method for the continuous proportional mixing of a primary fuel and supplemental fuel in a combustion engine supply system comprising initially by electric means initiating a supply of primary fuel for starting combustion, then by electric means automatically initiating a supply of supplemental fuel to the combustion air supply for the engine, then using variations in the flow of supplemental fuel to vary by electrical means the flow of primary fuel, constantly balancing automatically the relative flow of the two fuels for optimum efficiency of operation of the combustion engine and modifying the flow of the supplemental fuel in proportion to the air flow condition in the supply of air for combustion in the engine.

29. A method for the continuous proportional mixing of a primary fuel and supplemental fuel in a combustion engine supply system comprising initiating by electric means a supply a primary fuel for starting combustion, then by electric means automatically initiating a supply of supplemental fuel to the combustion air supply for the engine, then using variations in the flow of supplemental fuel to vary by electrical means the flow of primary fuel and constantly balancing automatically the relative flow of the two fuels for optimum efficiency of operation of the combustion engine, the method being one wherein the supplemental fuel is first introduced during an initial period in vapor state to the supply of air for combustion and then after the initial period substantially simultaneously turning off the supply of supplemental fuel in vapor state and turning on the supply of supplemental fuel in liquid state independently of the primary delivery means, and converting the supplemental fuel in liquid state to vapor state before mixing it with air supplied for combustion in the engine.

30. A method for the continuous proportional mixing of a primary fuel and supplemental fuel in a combustion engine supply system comprising initiating by electric means a supply of primary fuel for starting combustion, then by electric means automatically initiating a supply of supplemental fuel to the combustion air supply for the engine in response to a variation in pressure of the primary fuel, then using variations in the flow of supplemental fuel to automatically vary by electrical means the flow of primary fuel and constantly balancing automatically the relative flow of the two fuels for optimum efficiency of operation of the combustion engine, said method including automatically cutting off the entire supply of supplemental fuel and supplying only primary fuel whenever the supply of supplemental fuel falls below a selected level.

31. A supplemental fuel system as in claim 1 wherein said compensating means is a pressure sensitive means responsive to changes in pressure in said primary fuel delivery means.

32. A supplemental fuel system as in claim 1 wherein said compensating means comprises a differential flow sensitive member responsive simultaneously to primary fuel flow condition and the flow condition in said supplemental delivery means.

33. A supplemental fuel system as in claim 32 wherein the primary fuel flow condition is a varying pressure condition.

34. A supplemental fuel system as in claim 32 wherein the flow condition in said supplemental delivery means is a varying pressure condition.

35. A supplemental fuel system as in claim 32 including a detector means between said differential flow sensitive member and said combustion air supply, said flow sensitive member being responsive to the flow condition in said combustion air supply.

36. A supplemental system for an engine which has a combustion stage, a conduit thereto for a combustion air supply, a primary source for a primary fuel agency, primary delivery means between said primary source and said combustion stage, and a primary pressure means for said primary delivery means, a supplemental source for a supplemental fuel agency including a supplemental delivery means between said supplemental source and said combustion air supply, and a flow control means in said supplemental delivery means for establishing an initial open flow condition therein, a temperature moderator in said supplemental delivery means responsive to temperature of said combustion air supply for moderating the temperature of said supplemental fuel agency, a main electrical circuit for said primary pressure means having an ignition initiator therein, adjusting means in said electrical circuit for establishing flow conditions in said primary delivery means, and compensating means for regulating the flow conditions in said supplemental delivery means, a detector means between said compensating means and said combustion air supply, said compensating means being responsive to the flow condition in said combustion air supply.

37. A supplemental system as in claim 36 wherein said detector means comprises a pressure responsive sensor in the combustion air supply and a constantly open conduit between said pressure responsive sensor and said compensating means.

38. A supplemental fuel system for an engine which has a combustion stage, a conduit thereto for combustion air in a flowing supply, a primary source for primary fuel, a primary delivery means between said primary source and said combustion stage, a primary fuel pressure means for said primary delivery means, a supplemental source for a supplemental fuel agency including a supplemental delivery means between said supplemental source and said air supply, and automatic flow control means in said supplemental delivery means for establishing flow condition therein with an initial open adjustment, a main electrical circuit for said primary fuel pressure means having an ignition initiator, adjusting means in said electrical circuit for establishing flow conditions in said primary delivery means, and automatic compensating means connected to said supplemental delivery means for regulating the flow condition from said supplemental delivery means to said combustion air supply, said compensating means being directly responsive to flow conditions in said primary delivery means.

39. A supplemental fuel system as in claim 38 wherein said compensating means comprises a pressure differential actuated movable element connected to a valve means, said movable element having one side responsive to pressure of said primary delivery means and the opposite side responsive to pressure of said supplemental delivery means whereby under increased load demands the supply of primary fuel is diminished and the supply of supplemental fuel agency is augmented.

40. A supplemental system for an engine which has a combustion stage, a conduit thereto for a flowing combustion air supply, a primary source for fuel, and a supplemental agency source, primary delivery means between said primary source and said combustion stage, and primary pressure means for said primary delivery means, a supplemental delivery means between said supplemental agency source and said air supply, and an automatic flow control means in said supplemental delivery means for establishing an initial open flow condition therein, a flow condition means for said supplemental delivery means responsive to the flow condition of said combustion air supply for moderating the flow of said supplemental agency, an electric circuit for said primary pressure means having a switch therein, adjusting means in said primary delivery means for establishing flow conditions in said primary delivery means and automatic compensating means for regulating the flow condition in said supplemental delivery means responsive to the flow condition in said primary delivery means.

41. A fuel system as in claim 40 wherein said automatic compensating means comprises an integrator device having an input side and an output side, said integrator device being simultaneously responsive to said flow condition means for the condition in said air supply and to said adjusting means for the flow condition in said primary delivery means, a linear variable differential motor element at the output side of said integrator, said automatic flow control means including a valve device in said supplemental delivery means responsive to movement of said linear variable motor element.

42. A fuel system as in claim 41 wherein the integrator comprises an electric amplifier and the adjusting means comprises a linear variable differential transformer in electric communication with said amplifier.

43. A fuel system as in claim 41 wherein the integrator comprises an electric amplifier and said signal means comprises a flow sensor and linear variable differential transformer element responsive thereto and in electric communication with said amplifier.

44. A fuel system as in claim 41 wherein said integrator comprises an electric amplifier, said adjusting means comprises a linear variable differential transformer in electric communication with said amplifier and said signal means comprises a flow sensor and linear variable differential transformer element responsive to the flow condition means in electric communication with said amplifier.

45. A fuel system as in claim 41 wherein said integrator comprises an electric amplifier and said flow condition means comprises a bi-metal heat sensor spring load on said linear variable differential motor element at the output side of said integrator.

46. A supplemental system for an engine which has a combustion stage, a conduit thereto for a flowing combustion air supply, a primary source for fuel, primary delivery means between said primary source and said combustion stage, and primary pressure means for said primary delivery means, a supplemental source for a supplemental agency including a supplemental delivery means between said supplemental source and said air supply, and an automatic flow control means in said supplemental delivery means for establishing an initial open flow condition therein, a flow condition means for said supplemental delivery means responsive to the flow condition of said combustion air supply for moderating the flow of said supplemental agency, an electrical circuit for said primary pressure means having a switch therein, adjusting means in said primary delivery means for establishing flow conditions in said primary delivery means and automatic compensating means for regulating the flow condition in said supplemental delivery means responsive to the flow condition in said primary delivery means, said automatic compensating means having an inflow line from said supplemental delivery means and an outflow line to said combustion air supply, said automatic compensating means comprising a pressure regulating and compensating device, a first input pressure passage to said regulating and compensating device in communication with said primary delivery means, an output pressure passage from and regulating and compensating device in communication with said automatic compensating means, and a second input pressure passage to said regulating and compensating device in communication with said flow condition means whereby to augment the pressure condition in said output pressure line.

47. A supplemental system as in claim 46 wherein said automatic compensating means includes a metering valve in one of the lines of the automatic compensating means responsive to the flow condition in said primary delivery means.

48. A supplemental system as in claim 46 wherein said automatic compensating means includes a metering valve in the outflow line of the automatic compensating means responsive jointly to the flow condition of said primary delivery means and the temperature of said combustion air supply.

49. A supplemental system as in claim 46 wherein said automatic compensating means includes a bleed line therefrom and a metering valve in said bleed line responsive to the flow condition of said primary delivery means and the flow condition of said combustion air supply.

50. A supplemental fuel system for a spark ignition engine which has a combustion chamber, a conduit thereto for a combustion air supply, a primary tank for primary fuel, primary delivery means from said primary tank to said combustion chamber, a throttle valve, fuel pressure generating means in said primary delivery means, an ignition system having an ignition switch therein for activating said pressure generating means, a supplemental tank for supplemental fuel in both liquid and gaseous form including supplemental delivery means from said supplemental tank to said air supply, supplemental feed lines respectively for liquid and gaseous supplemental fuel from said supplemental tank to said supplemental delivery means, a heat exchanger in said supplemental delivery means, a heat sensitive vapor temperature switch downstream of said heat exchanger, an electric actuated valve in each said feed line responsive selectively to said vapor temperature switch whereby to switch between gaseous and liquid forms of said supplemental fuel, a line pressure regulator in said supplemental delivery means downstream of said feed lines, said supplemental delivery means having an outlet orifice into said air supply, a temperature equalizer in said air supply and connected in said supplemental delivery means upstream of said outlet orifice, a bypass line having a pressure controlled orifice therein, said bypass line communicating between said primary delivery means and said fuel pressure generating means, a pressure responsive regulator in said supplemental delivery means and responsive to pressure conditions in said primary delivery means, a fail-safe accumulator chamber, a first supplemental branch line from said pressure responsive regulator to said accumulator chamber, a second supplemental branch line from said line pressure regulator to said accumulator, a check valve in each of said branch lines opening to allow flow to said accumulator chamber, electric signal and cut off switching function means responsive to a preset predetermined activated condition, excessive supplemental fuel system pressures accumulating in said chamber and a manual cut off means for said supplemental delivery means.

51. A dual-fuel system as in claim 50 wherein said primary fuel pressure means is a fuel pump and wherein said supplemental fuel tank has a gas containing portion and a liquid containing portion, a feed line from each said portion to said supplemental delivery means, a sensor responsive to temperature in said supplemental delivery means downstream of said heat exchanger and a valve control for each said feed line selectively responsive to said sensor whereby to deliver in the alternative gaseous or liquid fuel to said supplemental delivery means in response to demand of said sensor.

52. A supplemental fuel system as in claim 50 wherein there is an air control means in said combustion air supply and wherein there is a pressure responsive regulator having a regulator chamber including a pressure responsive means comprising a yieldable partition in said chamber, a first section on one side of said chamber, a supplemental fuel delivery orifice to said first section in communication with said supplemental delivery means, and a regulator valve for said supplemental delivery orifice responsive to said pressure responsive means, a second section of said chamber on the other side of said partition, a control pressure line in communication between said combustion air supply and the chamber whereby to vary the pressure and flow of said supplemental fuel in response to changes in pressure and velocity in said combustion air supply.

53. A supplemental fuel system as in claim 50 for a spark-ignition engine which has an intake manifold and wherein there is a pressure responsive regulator having a regulator chamber including a pressure responsive means, said pressure responsive means including a yieldable partition in said chamber, a first section on one side of said chamber, a supplemental fuel delivery orifice to said first section in communication with said supplemental delivery means, and a regulator valve for said supplemental delivery orifice responsive to said pressure responsive means, a second section of said chamber on the other side of said partition, and a control pressure line for communication between said manifold and said second section of the chamber whereby to vary the flow of said supplemental fuel in response to changes in intake manifold pressure in said engine.

54. A supplemental fuel system as in claim 53 wherein said pressure responsive means comprises a cylinder in communication with said control pressure line and having a reciprocating motor reciprocatably mounted therein, a resilient element acting between said piston and said partition and a counteracting resilient element acting between said reciprocating motor and a stationary portion of said regulator whereby said partition is adapted to be moved in response to both positive and negative intake manifold pressures in said control pressure line.

55. A supplemental fuel system as in claim 54 wherein there is a relay responsive to temperature of said supplemental fuel, a main solenoid valve in a main primary fuel line electrically connected to said relay in normally flow through condition, a primary fuel bypass line having a primary fuel bypass solenoid valve therein normally closed against flow, and an electric connection between said primary fuel bypass solenoid valve and said relay whereby on attainment of a selected temperature condition in the primary fuel, the main primary fuel solenoid valve is closed and the primary fuel bypass solenoid valve is opened.

56. A supplemental fuel system as in claim 24 wherein there is an electric connection from the fuel pump to the ignition switch and the supplemental delivery means from said solenoid valve has a connection to said automatic compensating means.

57. A supplemental fuel system as in claim 56 wherein there is temperature select relay, a relay energizer in the air supply conduit in circuit with said temperature select relay and an electric connection from said solenoid valve to said temperature select relay.

58. A supplemental fuel system as in claim 24 wherein there is a tank for said supplemental fuel agency upstream of said fuel pump and an inflatable bag in said tank at a location between the level of said supplemental agency in the tank and the top of the tank.

59. A supplemental fuel system as in claim 58 wherein there is a connection between the interior of said inflatable bag and atmosphere and a breather valve in said connection.

60. A supplemental fuel system as in claim 1 wherein there is a pressure booster in said supplemental delivery means and an actuator for said pressure booster, said actuator being responsive to pressure in said supplemental delivery means.

61. A supplemental fuel system as in claim 60 wherein the pressure booster is a pump powered by a low voltage D.C. motor.

62. A supplemental fuel system as in claim 61 wherein said actuator is in the supplemental delivery means downstream of said pump, a source of low voltage D.C. power and an electric connection between said actuator, said source of low voltage D.C. power and said low voltage D.C. motor.

63. A supplemental fuel system for an engine which has a combustion stage, a conduit thereto for a flowing combustion air supply, a primary source for primary fuel, a primary delivery means between said primary source and said combustion stage and primary fuel pressure means for said primary delivery means, a supplemental source for a supplemental fuel agency including a supplemental delivery means between said supplemental source and said combustion stage, and an automatic flow control means in said supplemental delivery means for establishing a flow condition therein, a temperature moderator for said supplemental delivery means for moderating the temperature of said supplemental fuel agency, an electric circuit for said primary fuel pressure means, means for energizing said electric circuit, adjusting means in said electric circuit for establishing flow conditions in said primary delivery means, and automatic compensating means for regulating the flow condition in said supplemental delivery means responsive to flow conditions in said primary delivery means.

* * * * *